United States Patent [19]

Kennedy et al.

[11] Patent Number: 5,961,951
[45] Date of Patent: Oct. 5, 1999

[54] SYNTHESIS ZSM-48

[75] Inventors: Carrie L. Kennedy, Turnersville; Louis D. Rollmann, Moorestown; John L. Schlenker, Thorofare, all of N.J.

[73] Assignee: Mobil Oil Corporation, Fairfax, Va.

[21] Appl. No.: 09/005,969

[22] Filed: Jan. 12, 1998

[51] Int. Cl.[6] .................................................. C01B 39/48
[52] U.S. Cl. ........................... 423/708; 423/709; 423/716
[58] Field of Search ..................................... 423/708, 709, 423/716

[56] References Cited

U.S. PATENT DOCUMENTS

| | | |
|---|---|---|
| 2,882,243 | 4/1959 | Milton . |
| 2,882,244 | 4/1959 | Milton . |
| 3,130,007 | 4/1964 | Breck . |
| 3,140,249 | 7/1964 | Plank et al. . |
| 3,140,251 | 7/1964 | Plank et al. . |
| 3,140,253 | 7/1964 | Plank et al. . |
| 3,247,195 | 4/1966 | Kerr . |
| 3,314,752 | 4/1967 | Kerr . |
| 3,702,886 | 11/1972 | Argauer et al. . |
| 3,709,979 | 1/1973 | Chu . |
| 3,832,449 | 8/1974 | Rosinski et al. . |
| 4,016,245 | 4/1977 | Plank et al. ............................. 423/706 |
| 4,061,724 | 12/1977 | Grose et al. . |
| 4,073,865 | 2/1978 | Flanigen et al. . |
| 4,104,294 | 8/1978 | Grose et al. . |
| 4,296,083 | 10/1981 | Rollmann .................................. 423/705 |
| 4,397,827 | 8/1983 | Chu . |
| 4,423,021 | 12/1983 | Rollmann et al. . |
| 4,448,675 | 5/1984 | Chu . |
| 4,581,212 | 4/1986 | Araya et al. ............................ 423/708 |
| 4,585,747 | 4/1986 | Valyocsik et al. ......................... 502/62 |
| 5,075,269 | 12/1991 | Degnan et al. ............................ 502/77 |
| 5,098,685 | 3/1992 | Casci et al. . |
| 5,614,166 | 3/1997 | Gies et al. .............................. 423/718 |
| 5,783,168 | 7/1998 | Verduijn et al. ......................... 423/708 |

OTHER PUBLICATIONS

J.L. Schlenker et al, "The Framework Topology of ZSM–48: A High Silica Zeolite," *Zeolite*, 1985, 5:355–358. Nov.

R. Szostak, *Handbook of Molecular Sieves*, Van Nostrand Rheinhold, New York 1992, pp. 551–553. (No Month).

*Primary Examiner*—Mark L. Bell
*Assistant Examiner*—David Sample
*Attorney, Agent, or Firm*—Peter W. Roberts; Malcolm D. Keen

[57] ABSTRACT

The present invention relates to a composition and a method for preparing ZSM-48 exhibiting an X-ray pattern having values as set forth in Table 1 of the specification. The method of the present invention includes (a) preparing a reaction mixture; and (b) maintaining the mixture under crystallization conditions until crystals of the ZSM-48 are formed. The mixture includes a source of silica, a source of trivalent metal oxide, an alkali metal oxide, ethylenediamine and water. The mixture, in terms of mole ratios of oxides, has the following composition ranges:

$SiO_2/Me_2O_3$: 100 to 1500, $M_{2/n}O/SiO_2$: 0 to 0.2, $RN/SiO_2$: 2.0 to 5.0, $OH^-/SiO_2$: 0 to 0.3, and $H_2O/SiO_2$: 10 to 100, wherein Me is a trivalent metal, M is an alkali metal and RN is ethylenediamine.

8 Claims, 1 Drawing Sheet

SYNTHESIS ZSM-48

BACKGROUND OF THE INVENTION

1. Field of the Invention

This invention relates to ZSM-48 having a new crystal morphology and a method for its preparation.

2. Description of the Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Zeolites typically have uniform pore diameters of about 3 angstroms to about 10 angstroms. The chemical composition of zeolites can vary widely and they typically consist of $SiO_2$ in which some of the silica atoms may be replace by tetravalent atoms such as Ti or Ge, by trivalent ions such as Al, B, Ga, Fe, or by bivalent ions such as Be, or by a combination of any of the aforementioned ions. When there is substitution by bivalent or trivalent ions, cations such as Na, K, Ca, $NH_4$ or H are also present.

Zeolites include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal, an alkaline earth metal cation, or an organic species such as a quaternary ammonium cation. This can be expressed wherein the ratio of aluminum to the number of various cations, such as Ca/2, Sr/2, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are usually occupied by molecules of water prior to dehydration.

Prior art techniques have resulted in the formation of a great variety of synthetic aluminosilicates. These aluminosilicates have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), and zeolite ZSM-12 (U.S. Pat. No. 3,832,449), merely to name a few.

The $SiO_2/Al_2O_3$ ratio of a given zeolite is often variable. For example, zeolite X can be synthesized with $SiO_2/Al_2O_3$ ratio of from about 2 to about 3; zeolite Y, from about 3 to about 6. In some zeolites, the upper limit of $SiO_2/Al_2O_3$ ratio is unbounded. ZSM-5 is one such example wherein $SiO_2/Al_2O_3$ ratio is at least five. U.S. Pat. No. 3,941,871 discloses a crystalline metal organosilicate essentially free of aluminum and exhibiting an X-ray diffraction pattern characteristic of ZSM-5 type aluminosilicates. U.S. Pat. Nos. 4,061,724, 4,073,865 and 4,104,294 describe microporous, crystalline silicas or organosilicates of varying alumina and metal content.

U.S. Pat. No. 4,423,021 to Rollmann et al. describes a method for synthesizing silico-crystal ZSM-48 using a diamine having four to twelve carbons as the directing agent. The composition is described as a silico-crystal and it includes very little, if any aluminum.

U.S. Pat. Nos. 4,397,827 and 4,448,675 to Chu also describes method for synthesizing a silico-crystal ZSM-48 including very little, if any, aluminum. The synthesis utilizes a mixture of an amine having from two to twelve carbons and tetramethylammonium compound as the directing agent.

U.S. Pat. No. 5,075,269 to Degnan et al. describes silico-crystal ZSM-48 prepared with organic linear diquaternary ammonium compound as the directing agent. The crystal morphology is illustrated in FIGS. 3 and 4 of the patent and is described as having platelet-like crystal morphology at high silica/alumina ratios and aggregates of small irregularly shaped crystals at silica/alumina ratios below 200. In U.S. Pat. No. 5,075,269 this is compared with the crystal morphology of Rollmann et al. (U.S. Pat. No. 4,423,021) in FIG. 1 and Chu (U.S. Pat. No. 4,397,827) in FIG. 2. FIGS. 1 and 2 show a rod-like or needle-like crystal morphology which is random and dispersed.

ZSM-48 is also described by R. Szostak, Handbook of Molecular Sieves, Van Nostrand Rheinhold, New York 1992, at pp. 551–553. Organics are listed as diquat-6, bis (N-methylpyridyl)ethylinium, diethylenetriamine, triethylenetetramine, tetraethylenepentamine, 1, 4, 8, 11-tetra-aza-undecane, 1, 5, 9, 13-tetra-aza-undecane, 1, 5, 8, 12-tetra-aza-undecane, 1, 3-diaminopropane, n-propylamine/TMA$^+$, hexane-diamine and triethylamine. There is no suggestion of ethylenediamine. In addition, the crystal habit is described therein as bundles of needles and there is no suggestion of radial morphology.

Accordingly, the prior art utilizes relatively complex and expensive organics. It is an object of the present invention to overcome disadvantages of the prior art using a less expensive and readily available directing agent to make ZSM-48. This reduces manufacturing costs and provides a superior ZSM-48 product.

SUMMARY OF THE INVENTION

The present invention is directed to ZSM-48, preferably exhibiting radial aggregate morphology, and a method for its preparation. The product can be prepared from a reaction mixture which includes sources of silica, trivalent metal oxide, alkali metal oxide, and a directing agent of ethylenediamine in a solvent phase which includes water. The ethylenediamine, which is a liquid, can also be considered to be part of the solvent phase. The mixture, in terms of mole ratios of oxides, has the following composition ranges:

$SiO_2/Me_2O_3$: 100 to about 1500, $M_{2/n}O/SiO_2$: 0 to 0.2, $RN/SiO_2$: 1.0 to 5.0, $OH^-/SiO_2$: 0 to 0.3, and $H_2O/SiO_2$: 10 to 100, wherein Me is trivalent metal, preferably aluminum, M is alkali metal and RN is ethylenediamine.

The ethylenediamine constitutes between 2 and 30 mole %, i.e., from greater than 2 to less than 30 mole %, preferably from about 5 to about 20 mole %, and more preferably from about 8 to about 15 mole % of the solvent phase.

The reaction mixture is prepared and maintained under conditions sufficient for the crystallization of the porous ZSM-48. The conditions preferably include a temperature of from about 100° to about 200° C., more preferably 140° to 170° C., and pressure preferably from about 1 atm to about 15 atm, more preferably 3 atm to 8 atm, e.g., in an autoclave or static or rocking bomb reactor, with or without seeding.

The zeolite ZSM-48 prepared by the method of the present invention, while exhibiting the same X-ray characteristics of the conventionally prepared ZSM-48, frequently possesses a surprisingly different crystal morphology. The ZSM-48 of the present invention is less fibrous than many conventionally prepared ZSM-48 crystals. By fibrous is meant crystals in the form of individual rods or needles, whose length is at least 5 and often at least 10 times their diameter. A ZSM-48 prepared with ethylenediamine directing agent can possess a radial aggregate morphology. The resulting morphology can be described as sea urchin-like. ZSM-48 crystals prepared by conventional prior art methods possess a dispersed or bundled rod or needle-like morphology or platelet morphology.

The as-synthesized product is also low in alkali metal ion, and after calcination to remove the organic, advantageously can be used as an acidic catalyst component without ion exchange.

For better understanding of the present invention, together with other and further objects, reference is made to the following description and its scope will be pointed out in the appended claims.

DETAILED DESCRIPTION OF THE PRESENT INVENTION

Figure 1:
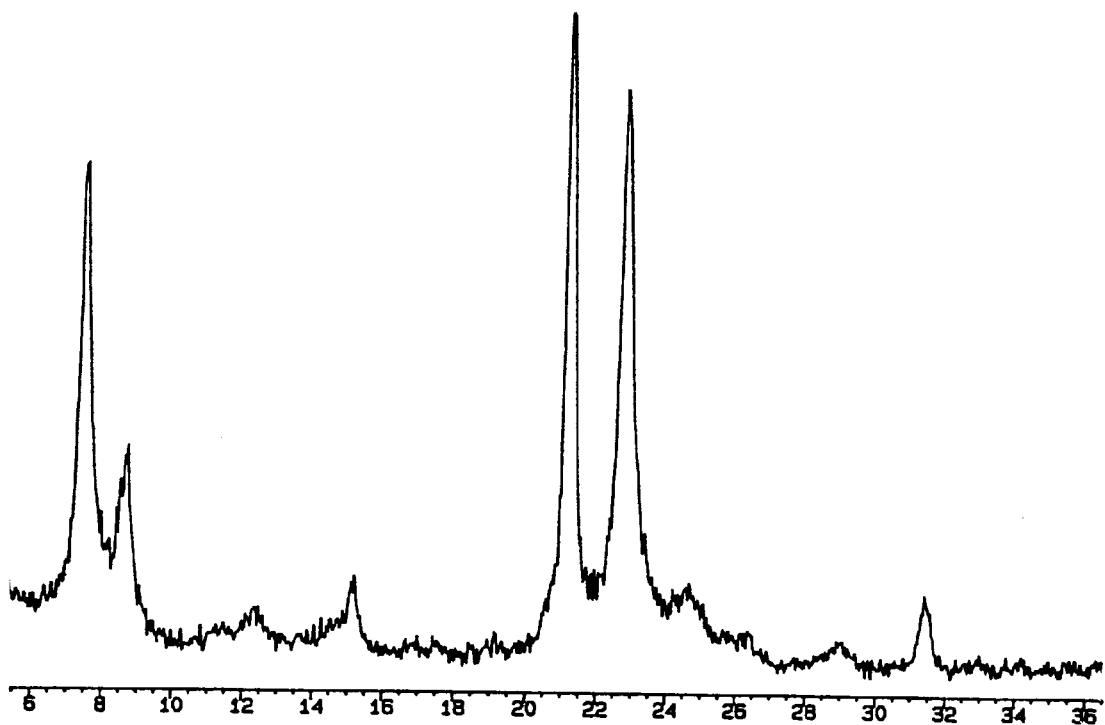
FIG. 1 is the X-ray diffraction pattern of the ZSM-48 prepared with ethylenediamine directing agent.

The present invention includes a method for preparing ZSM-48. The composition of the as-synthesized ZSM-48 can be identified, in terms of moles of anhydrous oxides per 100 moles of silica as follows:

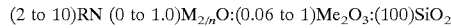

(2 to 10)RN (0 to 1.0)$M_{2/n}O$:(0.06 to 1)$Me_2O_3$:(100)$SiO_2$ wherein RN is an ethylenediamine, M is at least one cation having a valence n, $Me_2O$ is an oxide of a trivalent metal, e.g., aluminum, titanium, iron, chromium, zirconium, vanadium, molybdenum, arsenic, antimony, manganese, gallium, germanium, boron, etc. or combination thereof, and wherein the composition is characterized by the distinctive X-ray diffraction pattern as shown in Table 1 below.

Ethylenediamine is generally an alkaline liquid soluble in water and which, besides acting as an organic directing agent in the method of the present invention, can also be considered to form part of the solvent phase for crystallization, along with water.

It is recognized that, particularly when the composition contains tetrahedral, framework trivalent metal such as aluminum, a fraction of the amine functional groups may be protonated. The doubly protonated form, in conventional notation, would be $(RNH)_2O$ and is equivalent in stoichiometry to $RN+H_2O$.

In the crystallization of zeolites, a reaction mixture is prepared containing an oxide of silicon, a trivalent metal source, an alkali metal oxide, a templating agent which is generally an organic nitrogen containing compound, and an alkaline aqueous medium. Depending on the product desired, the crystallizations are generally carried out under hydrothermal conditions at a temperature from about 50° C. to about 300° C., at a pressure from about 15 psig to about 1000 psig for a time of about 0.5 hour to about two weeks.

The alkali metals include, e.g., sodium, lithium, and potassium.

In the as-synthesized zeolites, Brönsted acid sites are present at trivalent metal sites in the crystalline lattice. In the as-synthesized zeolites, alkali metal ions from the reaction mixture, such as sodium, are usually present, in effect balancing or neutralizing these acid sites. Often the alkali metal must be removed, generally by ion exchange, before the zeolite can be considered catalytically active.

In the present invention, the as-synthesized ZSM-48 is advantageously low in alkali metal ion and can be used as an active catalyst without ion exchange.

However, if desired, the original cations can be replaced, at least in part, by calcination and/or ion exchange with other cations according to techniques well known in the art. Thus, the original cations can be exchanged into a hydrogen or hydrogen ion precursor form such as ammonium or a form in which the original cation has been replaced by cations of rare earth metals, manganese, calcium, as well as metals of Groups II through VIII of the Periodic Table. Thus, for example, the original cations can be exchanged with ammonium ions or with hydronium ions. Catalytically active forms of these would include, in particular, hydrogen, rare earth metals, aluminum, metals of Groups II, e.g., zinc, and VIII, e.g., nickel, platinum and palladium of the Periodic Table and manganese. Typical ion exchange techniques include contacting the zeolite with a salt of the desired replacing cation. Although a variety of salts can be employed, particular preference is given to chlorides, nitrates and sulfates.

Representative ion-exchange techniques are disclosed in a wide variety of patents including U.S. Pat. Nos. 3,140,249, 3,140,251 and 3,140,253.

The X-ray diffraction pattern of ZSM48 has the significant lines shown in Table 1 and further characterized by the fact that it exhibits a single line within the range of 11.8±0.2 Angstrom units. The crystal does not have more than one X-ray diffraction line at 11.8±0.2 Angstrom units. The presence of only a single line at the indicated spacing structurally distinguishes the material from closely related material such as ZSM-12 (U.S. Pat. No. 3,832,449) which has a doublet (two lines) at 11.8±0.2 Angstrom units, and high silica ZSM-12 (U.S. Pat. No. 4,104,294) which also exhibits a doublet at 11.8±0.2 Angstrom units.

TABLE 1

Characteristic Lines of ZSM-48

| d(A) | Relative Intensity (I/I$_0$) |
|---|---|
| 11.8 +/− 0.2 | W–VS |
| 10.2 +/− 0.2 | W–M |
| 7.2 +/− 0.15 | W |
| 4.2 +/− 0.08 | VS |
| 3.9 +/− 0.08 | VS |
| 3.6 +/− 0.08 | W |
| 3.1 +/− 0.05 | W |
| 2.85 +/− 0.05 | W |

These values were determined by standard techniques. The radiation was the K-alpha doublet of copper, and a diffractometer equipped with a scintillation counter with a strip chart pen record was used. The peak heights, intensity (I), and the positions as function of 2 times theta, where theta is the Bragg angle, were read from the spectrometer chart. From these, the relative intensities, 100 I/I$_0$, where I$_0$ is the intensity of the strongest line or peak, and d (obs.), the interplanar spacing in A, corresponding to the recorded lines, were calculated. In Table 1 the relative intensities are given in terms of the symbols W for weak, VS for very strong and W–S for weak-to-strong (depending on the catonic form). Ion exchange of the sodium ion with cations reveals substantially the same pattern with some minor shafts in interplanar spacing and variations in relative intensity. Other minor variations can occur depending on the silicon to aluminum ratio of the particular sample, as well as if it has been subjected to thermal treatment.

The ZSM-48 of the present invention can be prepared from a crystallization reaction mixture containing a source of silica, an alkali metal (M) oxide or source thereof such as sodium silicate, alkali salt or alkali hydroxide, an organic directing agent of ethylenediamine RN, optionally a source of metal oxides Me$_2$O$_3$ or source thereof such as alumina gel, aluminum sulfate, iron sulfate, zirconyl chloride, gallium oxide, germania, titanyl chloride, boria, vanadia, chromia, molybdena, etc. and a solvent phase which includes water. The reaction mixture, in terms of mole ratios of oxides, preferably has the following composition ranges:

| REACTANTS | BROAD | PREFERRED |
|---|---|---|
| SiO$_2$/Al$_2$O$_3$ | 100 to 1500 | 150 to 500 |
| M/SiO$_2$ | 0 to 0.4 | 0.001 to 0.10 |
| RN/SiO$_2$ | 1.0 to 5.0 | 2.0 to 4.0 |
| OH$^-$/SiO$_2$ | 0 to 0.3 | 0.001 to 0.10 |
| H$_2$O/SiO$_2$ | 10 to 100 | 15 to 40 |

While it is not intended to be bound by theory, it is believed that the organic directing agent should be present in the crystallizing reaction mixture in an amount sufficient to fill the pores of the zeolite as they are being formed.

As described above, RN is the organic directing agent ethylenediamine. The amount of ethylenediamine in the solvent phase of the resulting mixture is important in producing a pure ZSM-48 crystal. In general, if the amount of ethylenediamine in the solvent phase is 20 mole percent or above, the resulting crystal will not be a pure ZSM-48 crystal, i.e., the resulting crystal will contain a different crystalline aluminosilicate, such as ZSM-5. Often, if the amount of ethylenediamine in the solvent phase is about 5 mole % or less, the resulting crystal will also not be a pure ZSM-48 crystal, i.e., the resulting product is either less than 100% ZSM-48 crystal or simply amorphous.

The optimal amount of RN in the solvent phase is particularly dependent on such parameters as SiO$_2$/Me$_2$O$_3$ ratio, the presence of seeds, (usually added at 1–5%, based on silica) and the OH$^-$/SiO$_2$ ratio. At very high SiO$_2$/Me$_2$O$_3$ ratio, e.g., above 500, less RN is required, and 5 to 10% may be satisfactory. At lower SiO$_2$/Me$_2$O$_3$ ratio, more RN is required, e.g., 8 to 15%.

Crystal morphology is also sensitive to variation in these parameters. For example, lower OH$^-$/SiO$_2$ ratios, e.g., below 0.05 are particularly preferred in order to obtain the radial aggregate crystal morphology.

The crystallization mixture of the present invention is maintained at a temperature range from about 100 to about 200° C., preferably from about 140 to about 170° C., until crystals of the material are formed. In calculating OH$^-$ values, it is recognized that aluminum is incorporated into the zeolite framework as AlO$_2$-anion.

The crystallization mixture of the present invention has a pH value preferably from about 7 to about 14, more preferably from about 11 to about 13.

The resulting ZSM-48 of the present invention contains sodium ions per unit cell in the amount of from about 0 to about 1.0 and usually from about 0.05 to about 0.5. A unit cell of ZSM-48 contains 48 Si and Al atoms.

The ethylenediamine molecules per unit cell present in the well-washed crystal of the present invention is from about 1.5 molecules to about 4.0 molecules, usually from about 2.0 to about 3.0.

The ZSM-48 of the present invention can also be used as a catalyst in intimate combination with an additional hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be exchanged into the composition, impregnated therein or physically intimately admixed therewith. Such component can be impregnated in or onto it such as, for example, by, in the case of platinum, treating with a solution containing platinum metal-containing ions. Thus, suitable platinum compounds include chloroplatinic acid, platinous chloride and various compounds containing the platinum ammine complex.

The ZSM-48 when employed either as an adsorbent or as a catalyst in one of the aforementioned processes should be dehydrated, at least partially. This can be done by heating to a temperature in the range of from about 100° C. to about 600° C. in an atmosphere, such as air, nitrogen, etc. and at atmospheric pressure from between about 1 and about 48 hours. Dehydration can also be performed at room temperature merely by placing the ZSM-48 type catalyst in a vacuum, but a longer time is required to obtain a sufficient amount of dehydration.

The crystallization of the ZSM-48 is usually carried out under pressure in an autoclave or static or rocking bomb reactor, from about 140 to about 170° C. Thereafter, the crystals are separated from the liquid and recovered. The composition can be prepared utilizing materials which supply the appropriate oxide. Such compositions include sodium silicate, silica hydrosol, silica gel, silicic acid, RN (ethylenediamine), sodium hydroxide, sodium chloride, aluminum sulfate, sodium aluminate, aluminum oxide, or aluminum itself.

As is the case with many catalysts, it is desired to incorporate the ZSM-48 with another material resistant to the temperatures and other conditions employed in organic conversion processes. Such materials include active and inactive materials and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the composition of the present invention, i.e., combined therewith which is active, tends to improve the conversion and/or selectivity of the catalyst in certain organic conversion processes. Inactive materials suitably serve as diluents to control the amount of conversion in a given process so that products can be obtained economically and without employing other means for controlling the rate of reaction. These materials may be incorporated into naturally-occurring clays, e.g., bentonite and kaolin, to improve the crush strength of the catalyst under commercial operating conditions. Such material, i.e., clays, oxides, etc., function as binders for the catalyst. It is desirable to provide a catalyst having good crush strength because in a petroleum refinery the catalyst is often subjected to rough handling, which tends to break the catalyst down into powder-like materials, which cause problems in processing. These clay binders have been employed for the purpose of improving the crush strength of the catalyst.

Naturally-occurring clays which can be composited with the ZSM-48 of the present invention include montmorillonite and kaolin families. These families include subbentonites, and kaolins commonly known as Dixie, McNamee, Georgia and Florida clays or others in which the main mineral constituent is halloysite, kaolinite, dickite, nacrite, or anauzite. Such clays can be used in the raw state as originally mined or initially subjected to calcination, acid treatment or chemical modification. Binders useful for compositing with the zeolite of the present invention also include inorganic oxides, notably alumina.

In addition to the foregoing materials, the zeolite of the present invention can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The relative proportions of finely divided ZSM-48 and inorganic oxide gel matrix vary widely with the ZSM-48 content ranging from about 1 to about 90 percent by weight and more usually, particularly when the composite is prepared in the form of beads, in the range from about 2 to about 70 percent by weight of the composite.

Employing a catalytically active form of the composition of this invention which contains a hydrogenation component, reforming stocks can be reformed employing a temperature from about 300° C. to about 600° C. The pressure can be from about 100 to about 1,000 psig but is preferably from about 200 to about 700 psig. The liquid hourly space velocity is generally from about 0.1 to about 10, preferably from about 0.5 to about 4 and the hydrogen to hydrocarbon mole ratio is generally from about 1 to about 20 preferably from about 4 to about 12.

The catalyst made with the ZSM-48 can also be used for hydroisomerization of normal paraffins, when provided with a hydrogenation component, e.g., platinum, hydroisomerization is carried out at a temperature from about 100° C. to about 400° C., preferably about 150° C. to about 300° C., with a liquid hourly space velocity between about 0.01 and about 2, preferably between about 0.25 and about 0.50 employing hydrogen such that the hydrogen to hydrocarbon mole ratio is between about 1:1 and about 5:1. Additionally, the catalyst can be used for olefin or aromatic isomerization employing temperatures between about 50° C. and about 400° C.

The catalyst can also be used for reducing the pour point of distillate fuels and lubricants. This reduction is carried out at a liquid hourly space velocity between about 0.5 and about 10, preferably between about 0.5 and about 5, and a temperature between about 200° C. and about 450° C., preferably between about 250° C. and about 400° C.

Other reactions which can be accomplished employing the catalyst of this invention with or without a metal, e.g., platinum, or palladium, include hydrogenation-dehydrogenation reactions and desulfurization reactions, olefin polymerization (oligomerization), aromatic alkylation with $C_2$–$C_{12}$ olefins or with $C_1$–$C_{12}$ alcohols, aromatics, isomerization, disproportionation and transalkylation and other organic compound conversion such as the conversion of alcohol (e.g., methanol) to hydrocarbon.

The following examples further illustrate the present invention but are not intended to limit the invention.

EXAMPLES

Examples 1 to 4 illustrate methods of producing pure ZSM-48 of the present invention. Examples 5 to 7 are comparative examples illustrating that when too much or too little of ethylenediamine is used to prepare ZSM-48, the product is either impure or amorphous.

Example 1

This Example shows the synthesis of pure ZSM-48 according to the invention. To a stirred solution of 1.1 g of 45% sodium aluminate (19.5% $Na_2O$, 25.5% $Al_2O_3$) in 270 cc of distilled water, 40 g of UltraSil silica (92.4% $SiO_2$, 0.4% $Na_2O$) was added. To the resultant stirred mixture, 93 g of ethylenediamine was added. The resultant mixture had a pH of approximately 12.1 and can be described by the following mole ratios of ingredients:

| | | | |
|---|---|---|---|
| $SiO_2/Al_2O_3$ = | 200 | $Na/SiO_2$ = | 200 |
| Diamine/$SiO_2$ = | 2.5 | $OH/SiO_2$ = | 0.002 |
| $H_2O/SiO_2$ = | 25 | | |

The resultant mixture contains 9 mole % of ethylenediamine in the solvent (ethylenediamine and water).

The mixture was heated for 65 hours at 160° C. in an autoclave stirred at 200 rpm, cooled, and filtered. The solid product was then washed with distilled water and dried at 120° C. On analysis, the solid product was identified as ZSM-48 sample having a $SiO_2/Al_2O_3$ ratio of 190. The ZSM-48 sample contained 0.1 Na ions and 2.3 ethylenediamine molecules per unit cell.

The ZSM-48 sample was found to be pure ZSM-48, as shown by the X-ray diffraction pattern in FIG. 1. The ZSM-48 sample is crystalline aggregate having sea urchin-like morphology.

Example 2

This Example illustrates that pure ZSM-48 can be prepared by using different ratios of reactants. The procedures of Example 1 were repeated except that the ratios of reactants were as follows:

| | | | |
|---|---|---|---|
| $SiO_2/Al_2O_3$ = | 200 | $Na/SiO_2$ = | 0.02 |
| Diamine/$SiO_2$ = | 3.0 | $OH/SiO_2$ = | 0.002 |
| $H_2O/SiO_2$ = | 18 | | |

In this Example, 14 mole % of the solvent was ethylenediamine, and the pH of the starting mixture was 12.4.

The resultant product was again a pure ZSM-48 crystal having a $SiO_2/Al_2O_3$ ratio of 170. The resultant product contained 0.3 sodium ions and 2.6 ethylenediamine molecules per unit cell.

Example 3

This Example shows that the amount of ethylenediamine in these ZSM-48 preparations closely corresponds to the number of low energy sites in the framework. A computer model of the ZSM-48 framework and pore-space was generated using commercially available software (Cerius$^2$, Biosym/Molecular Simulations Inc.), and the number of ethylenediamine molecules required to fill the pores was calculated. Two different examples of the polymorphic ZSM-48 framework were used in the calculations, the UDUD and the UUDD structures described by J. L. Schlenker et al. in *Zeolites,* vol. 5, pages 355–358, November 1985.

In both cases, it was found that between about 2.2 and 2.9 molecules of ethylenediamine could be accommodated in one unit cell of ZSM-48, which is in excellent agreement with the amount of ethylenediamine found in the products of Examples 1 and 2.

Example 4

This Example shows that the temperature can be a varied in the successful crystallization of ZSM-48 using ethylenediamine. The starting reaction composition and the procedures of Example 2 were repeated except that the crystallization temperature was 149° C.

The resultant product of this example was pure ZSM-48.

Example 5

Comparative Example

This Example shows that an excess of ethylenediamine can promote the formation of zeolites other than ZSM-48. The procedures of Example 1 were repeated except that the amount of water was reduced, raising the molar proportion of ethylenediamine in the solvent to 17 mole %. The initial pH was 12.3.

The crystallization product was mainly ZSM-48, but it contained a small but evident amount of ZSM-5 contaminant.

Example 6

Comparative Example

This Example shows that a minimum amount of ethylenediamine is required for rapid and successful ZSM-48 crystallization and that the proportion of ethylenediamine in the "solvent phase" is particularly important. The procedure was the same as in Example 1 except that the molar ratios were as follows:

| | | | |
|---|---|---|---|
| $SiO_2/Al_2O_3 =$ | 200 | $Na/SiO_2 =$ | 0.02 |
| $Diamine/SiO_2 =$ | 1.5 | $OH/SiO_2 =$ | 0.002 |
| $H_2O/SiO_2 =$ | 18 | | |

The resultant product was incompletely crystallized ZSM-48. It contained only 20% ZSM-48, together with amorphous material.

Example 7

Comparative Example

This Example shows that a minimum amount of ethylenediamine is required for rapid and successful ZSM-48 crystallization and that the proportion of ethylenediamine in the "solvent phase" is particularly important. The procedure was the same as in Example 1 except that the molar ratios were as follows:

| | | | |
|---|---|---|---|
| $SiO_2/Al_2O_3 =$ | 200 | $Na/SiO_2 =$ | 0.02 |
| $Diamine/SiO_2 =$ | 2.0 | $OH/SiO_2 =$ | 0.002 |
| $H_2O/SiO_2 =$ | 30 | | |

The resultant product is amorphous, after 65 hours at 160° C.

While there have been described what are presently believed to be the preferred embodiments of the invention, those skilled in the art will realize that various changes and modifications may be made to the invention without departing from the spirit of such invention. All such changes and modifications which fall within the scope of the invention are therefore intended to be claimed.

What is claimed is:

1. A method for preparing ZSM-48 which comprises:

(a) preparing a reaction mixture comprising a source of silica, a source of trivalent metal oxide, an alkali metal oxide and a directing agent of ethylenediamine in a solvent phase comprising water, wherein said mixture, in terms of mole ratios of oxides, has the following composition ranges:

$SiO_2/Me_2O_3$: 100 to 1500, $M_{2/n}O/SiO_2$: 0 to 0.2, $RN/SiO_2$: 1.0 to 5.0, $OH^-/SiO_2$: 0 to 0.3, and $H_2O/SiO_2$: 10 to 100, wherein Me is trivalent metal, M is akali metal and RN is ethylenediamine; and (b) maintaining said mixture under crystallization conditions until crystals of said ZSM-48 are formed.

2. The method according to claim 1, wherein said mixture has the following composition ranges:

$SiO_2/Me_2O_3$: 150 to 500, $M_{2/n}O/SiO_2$: 0.001 to 0.10, $RN/SiO_2$: 2.0 to 4.0, $OH^-/SiO_2$: 0.001 to 0.10, and $H_2O/SiO_2$: 15 to 40.

3. The method according to claim 1, wherein the amount of said ethylenediamine is from greater than 5 to less than 20 mole % of the total solvent.

4. The method according to claim 1, wherein the amount of said ethylenediamine is from about 8 to about 15 mole % of the total solvent.

5. The method of claim 1 wherein the reaction mixture further comprises seed crystals.

6. The method of claim 5 wherein the seed crystals are in amount of from about 1 to about 5% based on silica.

7. The product of claim 1 having radial aggregate morphology.

8. A composition capable of forming crystals of ZSM-48 structure upon crystallization which comprises a reaction mixture comprising a source of silica, a source of trivalent metal oxide, an alkali metal oxide, and ethylenediamine in a solvent phase comprising water, wherein said mixture, in terms of mole ratios of oxides, has the following composition ranges:

$SiO_2/Me_2O_3$: 150 to 500, $M_{2/n}O/SiO_2$: 0.001 to 0.10, $RN/SiO_2$: 2.0 to 4.0, $OH^-/SiO_2$: 0.001 to 0.10, and $H_2O/SiO_2$: 15 to 40, wherein Me is trivalent metal, M is an alkali metal and RN is ethylenediamine.

* * * * *